April 17, 1951     C. A. WOODWARD     2,549,655
TUNING INDICATOR FOR RADIOS AND THE LIKE
Filed Jan. 14, 1949     2 Sheets—Sheet 1
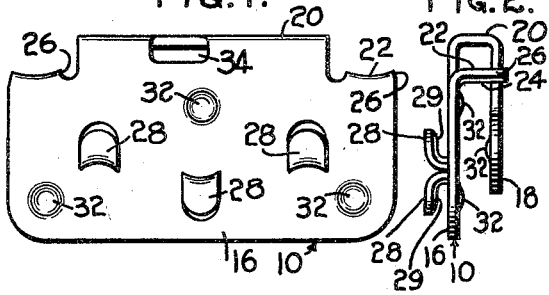
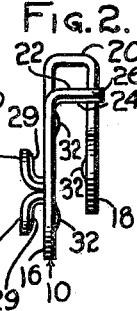
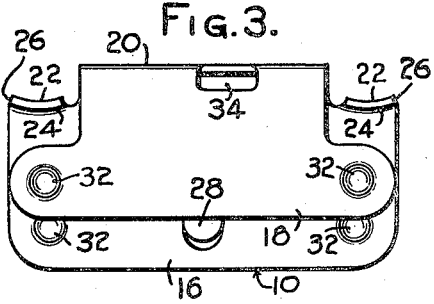
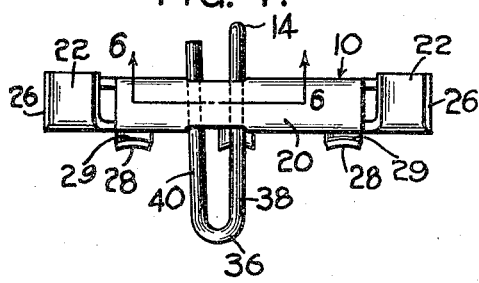
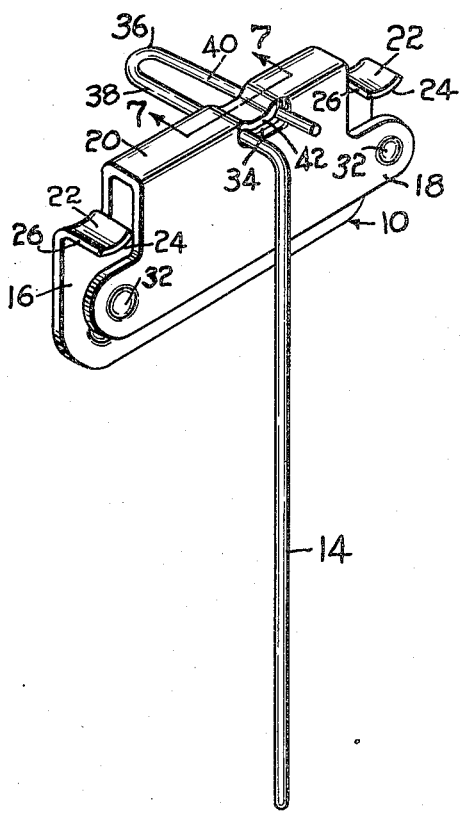
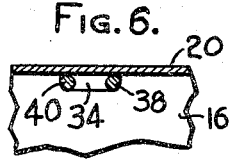
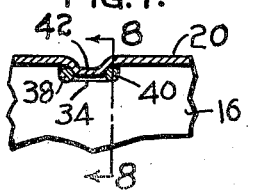
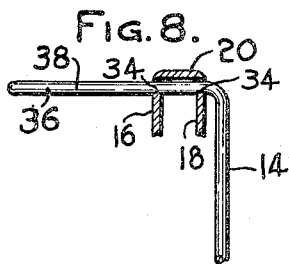
INVENTOR:
CLEMENT A. WOODWARD,
By Philip E. Parker
ATTORNEY.

April 17, 1951 C. A. WOODWARD 2,549,655
TUNING INDICATOR FOR RADIOS AND THE LIKE
Filed Jan. 14, 1949 2 Sheets-Sheet 2
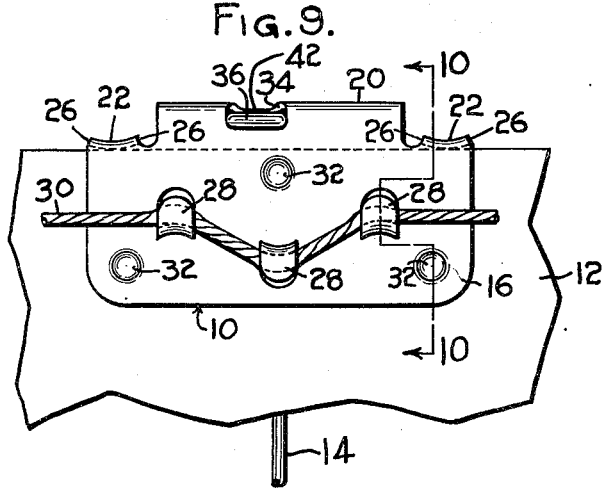
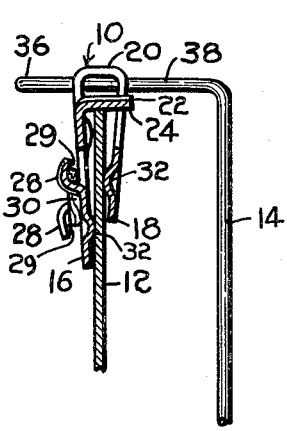
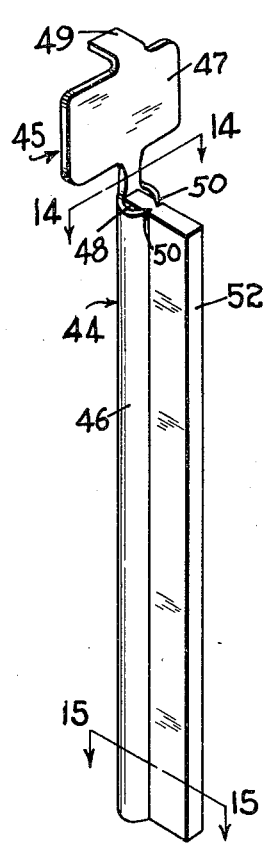
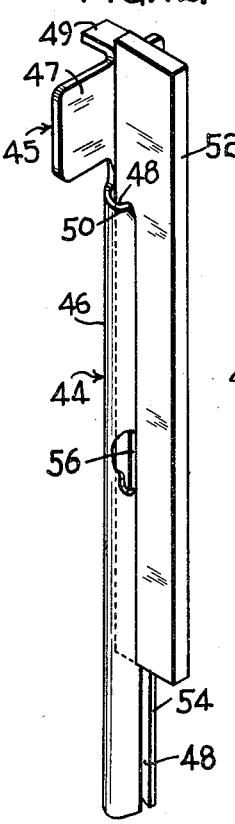
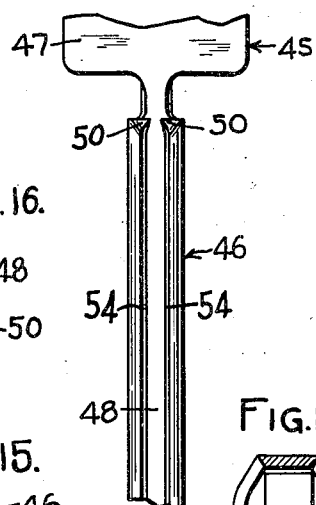
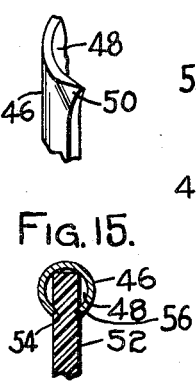
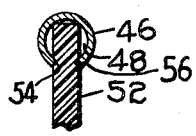
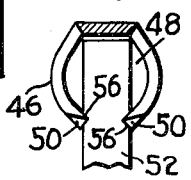
INVENTOR:
CLEMENT A WOODWARD,
By Philip E. Parker
ATTORNEY.

Patented Apr. 17, 1951

2,549,655

UNITED STATES PATENT OFFICE 2,549,655

TUNING INDICATOR FOR RADIOS AND THE LIKE

Clement A. Woodward, Wellesley, Mass., assignor to United-Carr Fastener Corporation, Cambridge, Mass., a corporation of Massachusetts Application January 14, 1949, Serial No. 70,888

7 Claims. (Cl. 116—136.5)

This invention relates generally to radio tuning indicators of the type employing a dial scale and a movable pointer, and has particular reference to the provision of improvements in the pointers and in the means for supporting the pointer.

Certain types of radio tuning indicator mechanisms have a support member which carries a tuning indicator pointer, which support member is caused to slide along a guide rail by means of a cord attached to the member. Since such supporting members must have means thereon for attaching the cord, means for attaching the pointer, and means for maintaining the supporting member in slidable relation on the guide rail, the shape of the supporting member is necessarily complicated. In forming such members of sheet metal, it has heretofore been necessary to form a sheet metal blank in a punch press, and thereafter subject the blank to a number of individual forming operations, to impart the desired shape to the member. Such forming operations require the use of a number of different machines to accomplish the different operations, and consequently the cost of manufacturing such members has been unduly high.

Since a support member of the given size and shape is generally adapted for use with only one particular type of tuning apparatus, and cannot be adjusted for use with a different type, it has been necessary to manufacture a large variety of support members for use in radios of various sizes and makes.

Moreover, support members of the prior art have not been entirely satisfactory in operation, since the forming operations frequently create burrs on the edges of the member. When such burrs occur on the portion which makes sliding control with the rail, they tend to cause erratic and jumpy movement of the support along the rail during tuning operations.

The object of this invention is to provide an improved tuning indicator support and pointer which can be adapted for use with a wide variety of tuning indicator mechanisms.

A further object of the invention is to provide an improved tuning indicator support having bearing surfaces which render the support freely slidable on a guide rail.

A still further object of the invention is to provide a tuning indicator support and associated pointer, in which the pointer is capable of being adjusted in relation to the support member during assembly therewith.

Another object of the invention is to provide a tuning indicator support member which can be made from a sheet metal blank on a single automatic forming machine by a standard set of tools, but which can be adjusted in an assembly operation for the particular installation.

Another object of the invention is to provide a tuning indicator pointer comprising a metal member and a plastic member in which the metal member has means for positively retaining the plastic member therein.

Other objects of the invention will, in part, be obvious, and will, in part, appear hereinafter.

For a fuller understanding of the nature and objects of the invention, reference should be had to the following detailed description, taken in conjunction with the accompanying drawings in which:

Fig. 1 is a view in elevation of a support member embodying the features of the invention;

Fig. 2 is a view of the support member of Fig. 1 as seen from the right side;

Fig. 3 is a view of the opposite side of the support member of Fig. 1;

Fig. 4 is a plan view of the support member and a tuning indicator pointer illustrating the method of assembly;

Fig. 5 is a perspective view of the support member and the assembled tuning indicator pointer, illustrating the method of locking the pointer in a predetermined relation to the support member;

Fig. 6 is a view in section on line 6—6 of Fig. 4;

Fig. 7 is a view in section on line 7—7 of Fig. 5;

Fig. 8 is a view in section on line 8—8 of Fig. 7;

Fig. 9 is a view in elevation of the support member and pointer assembled on a guide rail;

Fig. 10 is a view in section on line 10—10 of Fig. 9;

Fig. 11 is a perspective view of another type of tuning indicator pointer assembly adapted for use with the support member comprising a tubular member with a plastic member assembled therein;

Fig. 12 is a perspective view of the tuning indicator assembly of Fig. 11, illustrating the method of assembly of the component parts;

Fig. 13 is a view in elevation of the tubular member illustrated as part of the tuning indicator pointer assembly of Fig. 11;

Fig. 14 is a view in section taken on line 14—14 of Fig. 11;

Fig. 15 is a view in section taken on line 15—15 of Fig. 11; and

Fig. 16 is an enlarged view of a portion of the tubular member of Fig. 13.

Referring to the drawing, there is illustrated a support member 10 preferably made of sheet metal which is adapted to slide on a guide rail 12, and carry a tuning indicator pointer 14. The member 10 comprises a pair of guide plates 16 and 18, shaped and arranged to be disposed on opposite sides of the rail 12 when the support is assembled thereon. The guide plates are connected at a point above the rail by a connecting portion 20, which is deformable to allow the guide plates 16 and 18 to be bent toward or away from each other, for a purpose to be hereinafter described. The member 10 may be conveniently formed by stamping a blank of suitable shape from sheet metal, and forming the blank by subsequent bending operations to provide the guide plates 16 and 18 and the connecting portion 20. Guide plate 16 is provided with bearing members 22, having convex bearing surfaces 24, which are disposed to rest on guide rail 12. By providing convex bearing surfaces 24, edges 26 of the bearing members are prevented from contacting the rail 14, and any burrs remaining on the edges 26 from the forming operation will not interfere with the free sliding of the support member 10 along the rail. The guide plate 16 is also provided with a number of projecting tabs 28, which are disposed on the plate in non-linear relationship, so that a driving cord 30 may be disposed thereon. The tabs 28 may be formed by punching out portions of the guide plate 16, and preferably have a rounded cord-supporting surface 29 to prevent chafing of the cord during operation of the tuning mechanism.

Each guide plate is provided on the inner side with a number of rounded projections 32 to bear in slidable relation with the sides of the rail 12 when the support is assembled thereon.

A pair of openings 34 are provided at the upper portion of the guide plates to receive a U-shaped attaching portion 36 of the tuning indicator portion 14. The attaching portion 36 comprises a leg 38 and a free end portion 40 which are connected by a bight portion and disposed at a small angle to each other. To assemble the members, the attaching portion 36 is inserted through the openings 34 whose dimensions are such that the free end portion 40 and the leg are compressed relative to each other. The U-shaped attaching portion is thereby maintained temporarily in engagement with the edges of the openings 34 by the spring action of the free end 40, facilitating adjustment of the tuning indicator relative to the support member. To secure the members permanently together a portion of the connecting means 20 adjacent the opening is forcibly deformed downwardly to form a locking member 42, which forces the leg and the free end portion of U-shaped member into positive gripping engagement with the edges of the openings 34 and the locking member 42. It will be understood that the pointer may be attached to the support member by other suitable means, such as by spot welding, or by the use of an eyelet inserted through the member 20 to engage the pointer attaching portion 36.

To assemble the support member 10 on the guide rail 12, the support member is placed astride the rail, and the guide plates 16 and 18 may then be bent toward each other to cause the rounded projections 32 to engage the sides of the rail.

The support member of the invention is adapted to be made on a single automatic forming machine, of the type which is commonly called an eyelet machine. By such machines, the members can be rapidly and cheaply produced. The support member may be adapted for use with a wide variety of tuning indicator mechanisms since the position of the tuning indicator pointer is readily adjustable in relation to the support member during assembly, to allow for different distance between the guide rail and the desired position of the pointer in different types of radios. The support member may also be readily adjusted during assembly to be adapted to guide rails of different thicknesses, by bending the guide plates into suitable relation. The operation of the device is more satisfactory than support members of the prior art, by reason of the convex bearing surfaces and the rounded projections on the guide plates, which enable the support to be drawn smoothly and easily along the rail by the cord, without jumpy or erratic movement resulting.

Referring now to Figs. 11 to 16, there is illustrated another type of pointer 44 adapted for use with the support member as hereinbefore described. The pointer 44 comprises a tubular member 46, and an attaching member 45 which is adapted to be secured to the support member 10. The attaching member may comprise an attaching plate 47 and an attaching tab 49. The tubular member 46 is provided with a longitudinal slot 48, having a pair of sharp projections 50 extending inwardly at one end thereof. A plastic member 52 is inserted endwise into the tubular member 46 as illustrated in Fig. 12. During insertion, the plastic member forces edges 54 of the tubular member slightly apart, and the sharp projections 50 cut grooves 56 in the sides of the plastic member, which are thereafter engaged by the edges 54. The plastic member is thereby securely retained against vibration, or loosening due to cold flow of the plastic material.

To assemble the pointer 44 with the support member 10, the tab 49 may be inserted into the openings 34, and secured therein either by spot welding or bending a portion of the connecting means 20 inwardly. The plate 47 may also be spot welded to the support 10.

Since certain modifications may be made in the device without departing from the scope of the invention, it is intended that all matter contained herein be interpreted in an illustrative and not in a limiting sense.

I claim:

1. A tuning indicator for radios and the like, comprising a tuning indicator pointer and a support member, the tuning indicator pointer comprising an indicator portion and a U-shaped attaching portion, said support member comprising guide plates adapted to be positioned astride a guide rail, opposed openings therein for receiving the U-shaped attaching portion, and means on the support member for engaging the U-shaped attaching portion to retain the tuning indicator pointer in fixed relation to the support member.

2. A tuning indicator for radios and the like, comprising a tuning indicator pointer and a support member, the tuning indicator pointer comprising an indicator portion and a U-shaped attaching portion, said support member comprising guide plates adapted to be positioned astride a guide rail, means connecting the guide plates to maintain them in spaced relation at the upper portion thereof, said guide plates having opposed openings at the upper portion, said U-shaped attaching portion being disposed through said openings, a portion of said means connecting the guide plates being deformed downwardly to engage said U-shaped attaching portion, whereby the tuning indicator pointer is retained in fixed relation to the support member.

3. A tuning indicator as set forth in claim 2, in which the U-shaped attaching portion and the opposed openings are of such relative size as to cause compression of the U-shaped portion when it is inserted through the openings, whereby the tuning indicator pointer is maintained in adjustable relation to the supporting member before engagement by the deformed portion of said connecting means.

4. A support member for radio tuning indicators and the like, the support member being formed from a single piece of sheet material of U-shaped cross-section and comprising opposing leg portions providing guide plates adapted to be positioned on opposite sides of a guide rail, and a bight portion connecting the leg portions providing means for maintaining the guide plates in spaced relation, said bight portion being deformable to allow variation in the spacing between the guide plates, said leg portions having opposed openings disposed adjacent the bight portion for receiving an attaching portion of a tuning indicator pointer, integral lugs disposed between said leg portions having convex bearing surfaces spaced from the bight portion disposed substantially normal to the leg portions for resting on a guide rail in slidable relation thereto, means on said bight portion for securing an attaching portion of a tuning indicator pointer in said opposed opening, and means on the outer face of one of said leg portions for receiving a driving cord for moving said support member along the guide rail.

5. A support member in accordance with claim 4 wherein the means on the bight portion for securing the attaching portion of a tuning indicator pointer comprises a portion of said bight portion which is deformable upon the application of pressure to clamp the attaching portion in the opposed openings of the guide plates.

6. A support member in accordance with claim 4 wherein the means for receiving a driving cord comprises a plurality of projecting tabs extending outwardly from the outer face of one guide plate, each projecting tab having a convex cord bearing surface on one side, one tab being disposed intermediate a pair of tabs and displaced to one side of a line passing through the tabs of said pair, and the bearing surfaces of the tabs of said pair facing away from said one tab, and the bearing surface of said one tab facing opposite said bearing surface of said pair of tabs.

7. A support member for radio tuning indicators and the like in accordance with claim 4 having rounded projections on the inner faces of the guide plates for slidably engaging the opposite faces of a guide rail.

CLEMENT A. WOODWARD.

REFERENCES CITED

The following references are of record in the file of this patent:

UNITED STATES PATENTS

| Number | Name | Date |
| --- | --- | --- |
| 1,879,294 | Jones et al. | Sept. 27, 1932 |
| 2,165,416 | Rydstedt | July 11, 1939 |
| 2,193,107 | Maris | Mar. 12, 1940 |